United States Patent
Youtz et al.

(10) Patent No.: US 12,238,636 B2
(45) Date of Patent: Feb. 25, 2025

(54) SYSTEMS AND METHODS FOR 5G CORE NETWORK ACCESS CONTROL

(71) Applicant: Verizon Patent and Licensing Inc., Basking Ridge, NJ (US)

(72) Inventors: Andrew E. Youtz, Princeton, NJ (US); Hui Zhao, Marlboro, NJ (US); Deepa Jagannatha, Bridgewater, NJ (US); Mary Williams, Miltona, MN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 356 days.

(21) Appl. No.: 17/812,255

(22) Filed: Jul. 13, 2022

(65) Prior Publication Data
US 2024/0022999 A1     Jan. 18, 2024

(51) Int. Cl.
*H04W 48/02* (2009.01)
*H04W 12/08* (2021.01)
*H04W 60/00* (2009.01)

(52) U.S. Cl.
CPC .......... *H04W 48/02* (2013.01); *H04W 12/08* (2013.01); *H04W 60/00* (2013.01)

(58) Field of Classification Search
CPC ..... H04W 48/02; H04W 12/08; H04W 60/00; H04W 48/18
See application file for complete search history.

(56) References Cited

U.S. PATENT DOCUMENTS

| | | | | |
|---|---|---|---|---|
| 11,178,558 B2* | 11/2021 | Garg | ..................... | H04W 76/22 |
| 11,343,734 B2* | 5/2022 | Karampatsis | ......... | H04W 76/15 |
| 11,638,319 B2* | 4/2023 | Jeon | ........................ | H04L 45/28 |
| | | | | 370/216 |
| 2020/0374772 A1* | 11/2020 | Zhang | ........... | H04W 36/008355 |
| 2021/0352180 A1* | 11/2021 | Xu | ......................... | H04M 15/85 |
| 2021/0352484 A1* | 11/2021 | Pandit | ................. | H04W 12/122 |
| 2021/0377848 A1* | 12/2021 | Wu | ........................ | H04W 76/20 |
| 2023/0180116 A1* | 6/2023 | Wang | .................... | H04W 48/18 |
| | | | | 370/331 |
| 2024/0114563 A1* | 4/2024 | Fei | ........................ | H04W 76/18 |

OTHER PUBLICATIONS

3rd Generation Partnership Project, "Technical Specification Group Core Network and Terminals; Characteristics of the Universal Subscriber Identity Module (USIM) application (Release 17)," 3GPP TS 31.102 V17.5.0 (Mar. 2022).

* cited by examiner

*Primary Examiner* — Kenneth T Lam

(57) ABSTRACT

A device described herein may receive an indication that the device is not authorized to access a first type of core network (e.g., a Fifth Generation ("5G") Core ("5GC")), and may detect that a first core network, of the first type of core network, is available for communication. The device may detect that a second core network, of a second type of core network (e.g., an Evolved Packet Core ("EPC")), is available for communication. Based on the indication that the device is not authorized to access the first type of core network, the device may request establishment of a communication session with the second core network (e.g., in lieu of requesting access the first core network).

20 Claims, 10 Drawing Sheets

SYSTEMS AND METHODS FOR 5G CORE NETWORK ACCESS CONTROL

BACKGROUND

Wireless networks may include one or more radio access networks ("RANs") that serve as a wireless interface between User Equipment ("UEs"), such as mobile telephones, Internet of Things ("IoT") devices, etc. and one or more core networks. The wireless networks may include one or more different types of core networks, such as an Evolved Packet Core ("EPC"), a Fifth Generation ("5G") Core ("5GC"), or other types of core networks.

DETAILED DESCRIPTION OF EXAMPLE EMBODIMENTS

Figure 1:
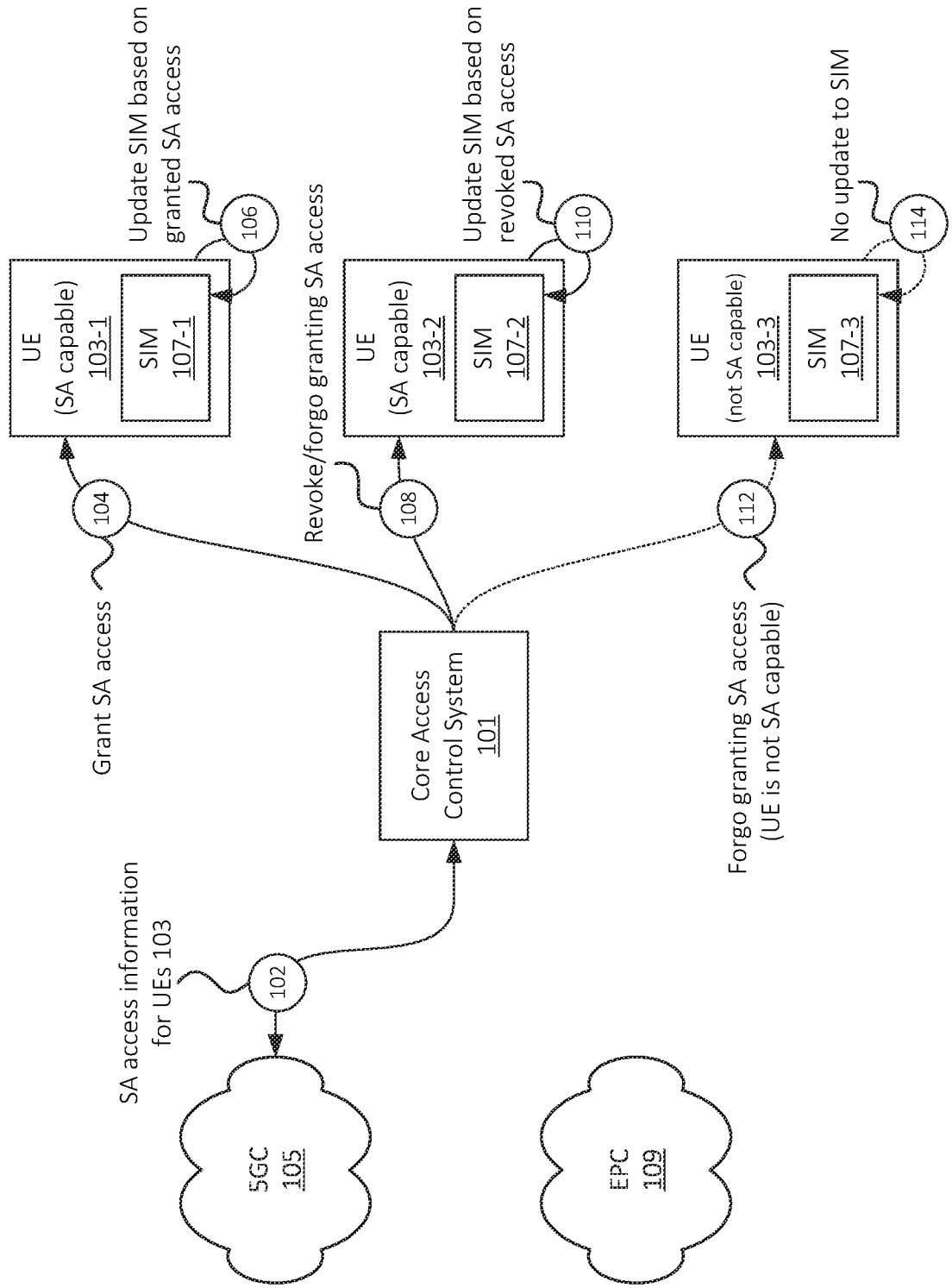
FIGS. 1 and 2 illustrate an example overview of one or more embodiments described herein.

The following detailed description refers to the accompanying drawings. The same reference numbers in different drawings may identify the same or similar elements.

Wireless networks may include multiple different core networks, such as an EPC, a 5GC, and/or other core networks. Similarly, wireless networks may include multiple different RANs, such as RANs that implement different radio access technologies ("RATs"), such as a Long-Term Evolution ("LTE"), a 5G RAT, etc.

Some wireless networks may offer a non-standalone ("NSA") access configuration, in which multiple different RANs may be used to access a particular core network. For example, in wireless network implementing a 5G Option 3 NSA configuration, an EPC may be accessed via a 5G RAN. In this type of configuration, an LTE RAN may serve as an "anchor" between the 5G RAN and the EPC, and communications between a UE receiving NSA access to the EPC may traverse the LTE RAN. Some networks may offer a standalone ("SA") access configuration, in which a particular core network may be accessed by UEs via a particular RAN or type of RAN. For example, a 5G SA configuration may provide access to a 5GC via one or more 5G RANs.

In some embodiments, some UEs may be "SA-capable" UEs, such as UEs that are configured to, or are otherwise able to, communicate with a first type of core network (e.g., a 5GC) via a first type of RAN (e.g., a 5G RAN). For example, SA-capable UEs may implement one or more messaging protocols, protocol stacks, authentication mechanisms, etc. that are implemented or required by the first type of core network.

Additionally, in some embodiments, some UEs may not be SA-capable UEs. For example, some such UEs may be "NSA-capable" UEs, such as UEs that are configured to communicate with a second type of core network (e.g., an EPC) via a second type of RAN (e.g., an LTE RAN). UEs that are not SA-capable UEs may not implement the one or more messaging protocols, protocol stacks, authentication mechanisms, etc. that are implemented or required by the first type of core network. Some UEs that are not SA-capable UEs may include UEs that are not able to communicate with the first type of RAN at all, such as UEs that do not include physical hardware (e.g., antennas, radios, etc.) that operate according to a RAT or RATs implemented by the first type of RAN.

Embodiments described herein may provide for the dynamic granting or revoking of authorization of one or more UEs to access a particular core network. Further, embodiments described herein may provide indications of such granting or revoking of authorization to such UEs, and UEs may accordingly determine whether to request access to the particular core network based on such granting or revoking of authorization. Access to a particular core network may be based on subscription or access parameters, network load, and/or other factors. Additionally, providing indications of whether the UE is authorized to access the particular core network may allow the UE to avoid initiating a procedure in which the UE requests a registration or connection with the core network when the UE is not authorized to access the core network (e.g., where the UE's authorization to access the core network may be revoked due to a lack of authentication parameters, such as 5G authentication parameters). Avoiding such procedures may result in reduced consumption of resources (e.g., network resources, processing resources, etc.) with the core network and/or the UE. Further, the user experience of a user of the UE may be enhanced, as the UE may more quickly establish communications with a core network that the UE is authorized to access (e.g., a different core network than the core network for which access has been revoked or otherwise not granted).

Examples are described herein in the context of SA-capable UEs that are able to communicate with a 5GC, where such capabilities may include implementing particular protocols, authentication mechanisms (e.g., a Subscription Concealed Identifier ("SUCI") or other type of encryption or authentication mechanism), etc. associated with the 5GC. For example, SA-capable UEs may be capable of communicating with an access control element (e.g., an Access and Mobility Management Function ("AMF") or other suitable device or system) of the 5GC, and/or implementing one or more protocols, authentication mechanisms, etc. used by the access control element to grant or deny access to the 5GC. In some embodiments, SA-capable UEs may also be able to communicate with another type of core network, such as an EPC, using NSA techniques, which may include implementing protocols, authentication mechanisms, etc. used by an access control element (e.g., a Mobility Management Entity ("MME") or other suitable device or system) of the EPC to grant or deny access to the EPC. In practice, similar concepts may apply to different types of core networks, and/or to UEs with additional or different particular capabilities than the UEs described herein.

Figure 2:
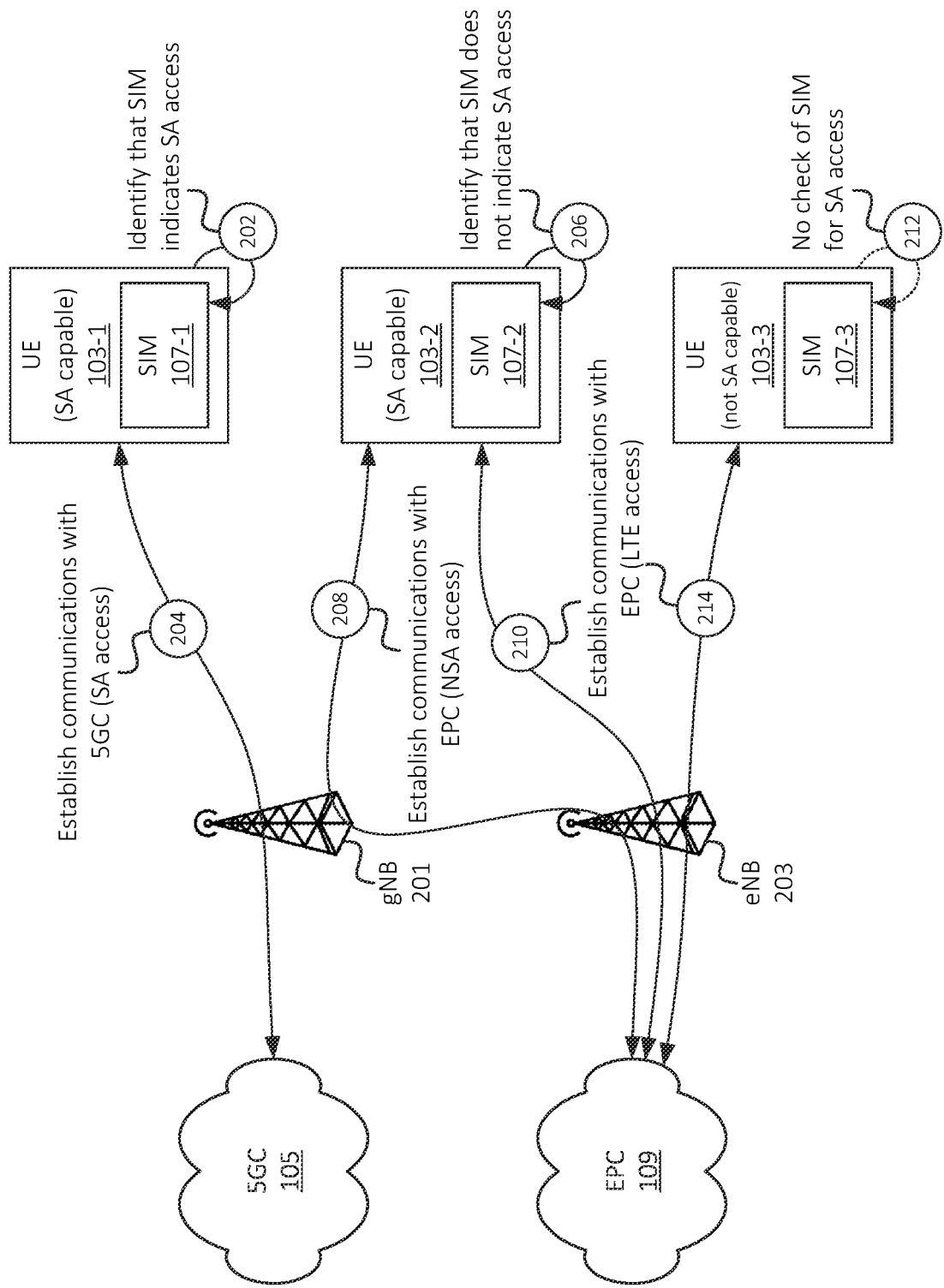

FIG. 1, as discussed below, discusses an embodiment in which access to a particular type of core network may be indicated, updated, etc., such that UEs 103 may become "aware" of types of core networks which they are authorized to access. FIG. 2, as discussed below, discusses an embodiment in which UEs 103, based on their "awareness" of authorized core networks, may forgo attempting to connect to core networks that such UEs 103 are not authorized to access. Forgoing such attempts may conserve time and network resources that would otherwise be consumed in a procedure in which UEs 103 request access to such type of core network and are subsequently denied access. In some embodiments, some operations of FIG. 1 may not be performed at all. For example, Subscriber Identification Module ("SIM") cards 107, that are installed in UEs 103, may be manufactured for, provided to, installed in, etc. UEs 103 with indications of particular types of core networks to which such UEs 103 are authorized to access. In such embodiments, access to a given type of core network may not be dynamically revoked, granted, etc., as such SIM cards 107 may be "hard coded" or otherwise unmodifiable, at least with respect to types of core networks which UEs 103 are authorized to access. In this manner, the operations described in FIG. 1 are not necessarily required for the operations described in FIG. 2, which discusses the time-saving and network resource-saving concepts of UEs 103 selectively determining which type(s) of core networks to which access should be requested.

As shown in FIG. 1, Core Access Control System ("CACS") 101 may receive (at 102) SA access information for one or more UEs 103, such as example UEs 103-1 and/or 103-2. For example, in this example, the SA access information may indicate that UE 103-1 has been granted SA access, and that UE 103-2 has not been granted SA access. For example, the information regarding UE 103-2 may indicate that SA access has been revoked from UE 103-2, in situations where UE 103-2 had previously been granted SA access, may indicate that UE 103-2 does not have SA access, and/or may not include an indication that UE 103-2 has been granted SA access. For example, the granting of SA access, as described herein, may refer to the authorization of a given UE (e.g., UE 103-1 in this example) to register, establish one or more communication sessions with, and/or otherwise communicate with a particular core network or type of core network, such as 5GC 105.

In some embodiments, CACS 101 may receive (at 102) the SA access information from one or more UE information repositories associated with 5GC 105 (e.g., a Unified Data Management function ("UDM") or other suitable device or system that maintains and/or provides such information). In some embodiments, CACS 101 may receive (at 102) the access information from 5GC 105 via a Network Exposure Function ("NEF") or other suitable device, system, or interface. In some embodiments, CACS 101 may receive the SA access information from some other source, such as a web portal, an application programming interface ("API"), or the like, and may provide (at 102) the SA access information to 5GC 105. Accordingly, in some embodiments, CACS 101 and/or 5GC 105 may maintain information indicating which UEs 103 are authorized to access 5GC 105 (e.g., via an SA access technique). In some embodiments, CACS 101 and 5GC 105 may maintain and/or access a synchronized ledger, such as a blockchain, that includes information indicating which UEs 103 are authorized to access 5GC 105.

CACS 101 may further provide (at 104) an indication to UE 103-1, indicating that UE 103-1 has been granted SA access (e.g., access to communicate with 5GC 105). In some embodiments, CACS 101 may provide (at 104) the indication of SA access to UE 103-1 via an Over-the-Air ("OTA") update procedure, an initial provisioning procedure, and/or some other suitable communication. In some embodiments, UE 103-1 may access the aforementioned ledger, blockchain, etc. to identify the SA access granted to UE 103-1.

UE 103-1 may locally maintain, update, etc. the information indicating that UE 103-1 has been granted SA access (e.g., access to communicate with 5GC 105). For example, in some embodiments, UE 103-1 may update (at 106) SIM card 107-1, Universal Integrated Circuit Card ("UICC"), and/or other suitable device or data structure of UE 103-1. In some embodiments, updating SIM card 107-1 (and/or other suitable device or data structure) may include modifying one or more fields, files, etc. associated with SIM card 107-1. While concepts herein are discussed in the context of a SIM card 107, in practice, other types of storage devices, data structures, etc. may be used by UEs 103 to maintain information indicating whether such UEs 103 are authorized to access one or more types of networks.

For example, based on the received indication (at 104), UE 103-1 may modify (at 106) one or more files stored within SIM card 107-1, such as an $EF_{5GS3GPPLOCI}$ file. In some embodiments, for example, SIM card 107-1 may receive the $EF_{5GS3GPPLOCI}$ file from one or more devices or systems associated with 5GC 105 (e.g., a SIM OTA update system) and/or some other source. In some embodiments, SIM card 107-1 may include a Universal Mobile Telecommunications Service ("UMTS") SIM ("USIM") Service Table ("UST"), indicating that UE 103-1 has access to communicate with 5GC 105. Additionally, or alternatively, UE 103-1 may update (at 106) a data structure stored within UE 103-1 (e.g., which may be a type of data structure or storage device other than SIM card 107-1), to indicate that UE 103-1 has been granted access to communicate with 5GC 105. For example, in some embodiments, UE 103-1 may not have access or the ability to modify SIM card 107-1. In some embodiments, for example, CACS 101 may include and/or may be communicatively coupled to a provisioning system, an OTA platform with which the SIM has a secure relationship (e.g., the OTA platform and SIM card 107-1 may be associated with one or more suitable authentication techniques), etc., where such secure relationship allows for the modification of SIM card 107-1 and/or some other suitable data structure or storage device of UE 103-1.

In some embodiments, updating SIM card 107-1 and/or some other data structure or storage device may include modifying a file that includes the UST, such as an $EF_{UST}$ file stored in SIM card 107-1. In some embodiments, the modification to the $EF_{UST}$ file may include setting a flag, bit, etc. to a particular value (e.g., to "0," "1," "enabled," "yes," etc.). In some embodiments, the modification to the $EF_{UST}$ file may include setting a "service n° 122" field to "enabled." For example, in some embodiments, the setting of the "enabled" value (or other suitable value) of the "service n° 122" field and the presence of the $EF_{5GS3GPPLOCI}$ file in SIM card 107-1 may be used by UE 103-1 to determine that UE 103-1 is authorized to access 5GC 105 and/or to facilitate the performance of one or more registration, authentication, etc. procedures with respect to 5GC 105. Additionally, or alternatively, in some embodiments, similar concepts may be performed without the modification of a UST file (e.g., suitable information may be stored, updated, etc. at some other data structure or storage device of UE 103-1). In some embodiments, UE 103-1 may maintain (at 106) the indication that UE 103-1 is authorized to access 5GC 105 in some other suitable manner (e.g., in addition to or in lieu of the example provided above with respect to SIM card 107-1).

As further shown, the SA access information received (at 102) by CACS 101 may indicate that UE 103-2 is not authorized to for SA access (e.g., is not authorized to access 5GC 105). Accordingly, CACS 101 may output (at 108) an indication to UE 103-2, indicating that UE 103-2 is not authorized for SA access. CACS 101 may output (at 108) such indication in situations where UE 103-2 was previously authorized to access 5GC 105. Additionally, or alternatively, CACS 101 may forgo outputting (at 108) the indication in situations where UE 103-2 was already not authorized to access 5GC 105 (e.g., where CACS 101 maintains or has previously received information indicating that UE 103-2 was not authorized to access 5GC 105).

In situations where UE 103-2 receives (at 108) information indicating that UE 103-2 is not authorized to access 5GC 105, UE 103-2 may update SIM card 107-2 based on the received indication. For example, UE 103-2 may modify a UST associated with SIM card 107-2 and/or other suitable data structure of SIM card 107-2 and/or UE 103-2 to reflect that UE 103-2 is not authorized to access 5GC 105. In some embodiments, as discussed above, the modification to the UST and/or other aspects of SIM card 107-2 may be made based on secure authentication techniques between CACS 101 (and/or an OTA platform with which CACS 101 is associated) and SIM card 107-2. In some embodiments, UE 103-2 may modify, remove, etc. one or more files, such as an $EF_{5GS3GPPLOCI}$ file of SIM card 107-2, based on the received (at 108) indication.

In some embodiments, CACS 101 may maintain information indicating that UE 103-3 is not authorized to access 5GC 105. For example, CACS 101 may maintain information indicating that UE 103-3 is not an SA-capable UE, may not maintain information indicating that UE 103-3 is an SA-capable UE, and/or may otherwise not maintain information indicating that UE 103-3 is authorized to access 5GC 105. For example, UE 103-3 may be capable of accessing EPC 109 (e.g., using an NSA access technique and/or via a RAN that is communicatively coupled to EPC, such as an LTE RAN), but may not be configured to communicate with 5GC 105.

In accordance with some embodiments, UEs 103 (e.g., UEs 103-1, 103-2, and/or 103-3) may selectively attempt to communicate with 5GC 105 based on information received, or not received, from CACS 101, as discussed above. For example, as shown in FIG. 2, assume that UEs 103-1 through 103-3 are within communication range of a 5G RAN (e.g., one or more Next Generation Node Bs ("gNBs") 201) and an LTE RAN (e.g., one or more evolved Node Bs ("eNBs") 203). Based on detecting the presence of gNB 201 and eNB 203, and further based on identifying (at 202) that UE 103-1 has been authorized for SA access (e.g., authorized to access 5GC 105), UE 103-1 may communicate (at 204) with 5GC 105 to establish communications between UE 103-1 and 5GC 105. For example, UE 103-1 and gNB 201 may perform a radio frequency ("RF") connection procedure (e.g., using one or more Radio Resource Control ("RRC") messages or other suitable messages), and UE 103-1 may communicate with an AMF or other suitable device or system of 5GC 105 using Non-Access Stratum ("NAS") messaging or other suitable messaging in order to establish one or more communication sessions with 5GC 105.

For example, as discussed above, the setting of the "enabled" value (or other suitable value) of the "service n° 122" field and the presence of the $EF_{5GS3GPPLOCI}$ file in SIM card 107-1 may be used by UE 103-1 to determine that UE 103-1 is authorized to access 5GC 105 and/or to facilitate the performance of one or more registration, authentication, etc. procedures with respect to 5GC 105. In some embodiments, UE 103-1 may maintain (at 106) the indication that UE 103-1 is authorized to access 5GC 105 in some other suitable manner (e.g., in addition to or in lieu of the example provided above with respect to SIM card 107-1).

Figure 3:
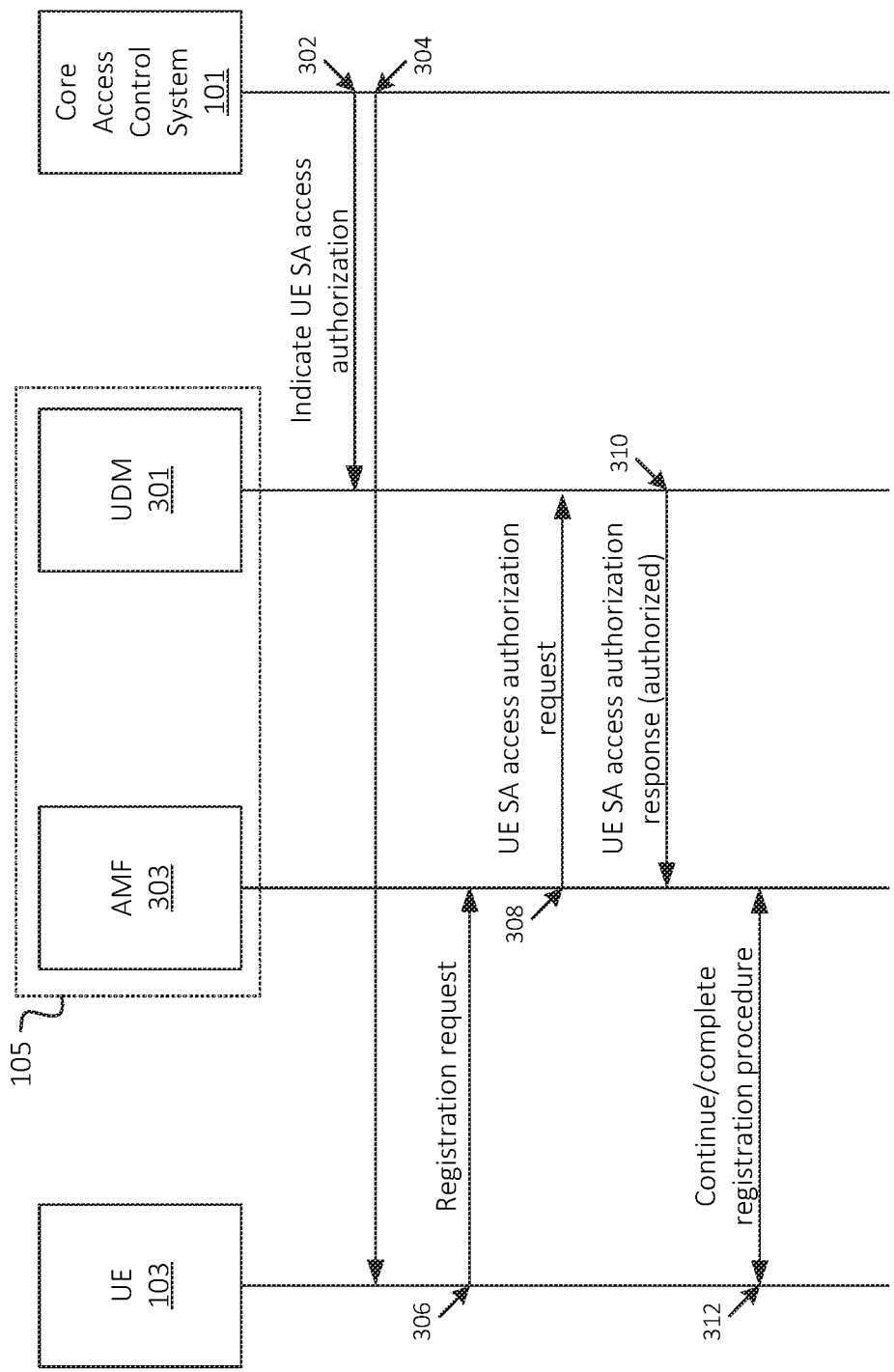
FIG. 3 illustrates an example of a core network accepting a registration request from a UE, in accordance with some embodiments.

FIG. 3 illustrates an example of communicating (e.g., at 204) with 5GC 105 to establish communications between a particular UE 103 (e.g., UE 103-1, in the example above) and 5GC 105. As shown, CACS 101 may output (at 302) an indication to one or more devices or systems of 5GC 105, such as UDM 301, that a particular UE 103 is authorized to access 5GC 105. In some embodiments, UDM 301 may receive such information from some other source, and/or may provide such information to CACS 101. In some embodiments, the indication provided to UDM 301 may include one or more identifiers of UE 103, such as a Subscription Permanent Identifier ("SUPI"), a Mobile Directory Number ("MDN"), an International Mobile Subscriber Identity ("IMSI"), or other suitable identifier. As similarly discussed above, CACS 101 may also provide (at 304) such indication to UE 103, which may maintain information indicating that UE 103 is authorized to access 5GC 105 in an associated SIM card 107 or in some other suitable manner.

UE 103 may additionally output (at 306) a registration request or other type of request to establish communications with 5GC 105 to AMF 303 of 5GC 105 (e.g., via NAS messaging or other suitable messaging). In some embodiments, the request may include authentication information, such as a SUCI or other information generated by or derived from SIM card 107. In some embodiments, AMF 303 may determine, based on the received information, whether to accept or deny the registration request. Additionally, or alternatively, AMF 303 may request (at 308) information from UDM 301, indicating whether UE 103 is authorized to access 5GC 105, and/or may otherwise determine whether UE 103 is authorized to access 5GC 105 based on information provided or maintained by UDM 301. In this example, since ULE 103 has been authorized (at 302) to access 5GC 105, UDM 301 may respond (at 310) to AMF 303 with an indication that UE 103 is authorized to access 5GC 105. Accordingly, since UE 103 is authorized to access 5GC 105, AMF 303 and UE 103 may continue and/or complete (at 312) the registration procedure and/or initiate the establishment of one or more communication sessions (e.g., protocol data unit ("PDU") sessions or other types of communication sessions) between 5GC 105 and UE 103.

Returning to FIG. 2, UE 103-2 may identify (at 206) that UE 103-2 is not authorized to access 5GC 105, even though UE 103-2 is an SA-capable UE. Based on identifying that UE 103-2 is not authorized to access 5GC 105, UE 103-2 may communicate with one or more access management devices of EPC 109 (e.g., an MME) to establish communications between EPC 109 and UE 103-2. For example, in some embodiments, UE 103-2 may communicate (at 208) with EPC 109 via NSA access, such as by communicating wirelessly with gNB 201, where gNB 201 relays such communications to eNB 203 (e.g., via an X2 interface or other suitable interface). Additionally, or alternatively, UE 103-2 may communicate (at 210) with EPC 109 via eNB 203 (e.g., via LTE access). Similarly, although not explicitly shown in FIG. 2, UE 103-1 may, in some situations, communicate with EPC 109 via NSA access and/or via LTE access.

As further shown in FIG. 2, as UE 103-3 is not an SA-capable UE, UE 103-3 may refrain from checking (at 212) whether UE 103-3 is authorized to access 5GC 105, and may accordingly communicate (at 214) with EPC 109 via eNB 203 (e.g., via LTE access). Additionally, or alternatively, UE 103-3 may communicate with EPC 109 via gNB 201 via NSA access. As similarly noted above, in such situations, eNB 203 may serve as an interface, relay, etc. between EPC 109 and gNB 201, such that UE 103-3 receives wireless access provided by gNB 201, and receives core services from 5GC 105.

Figure 4:
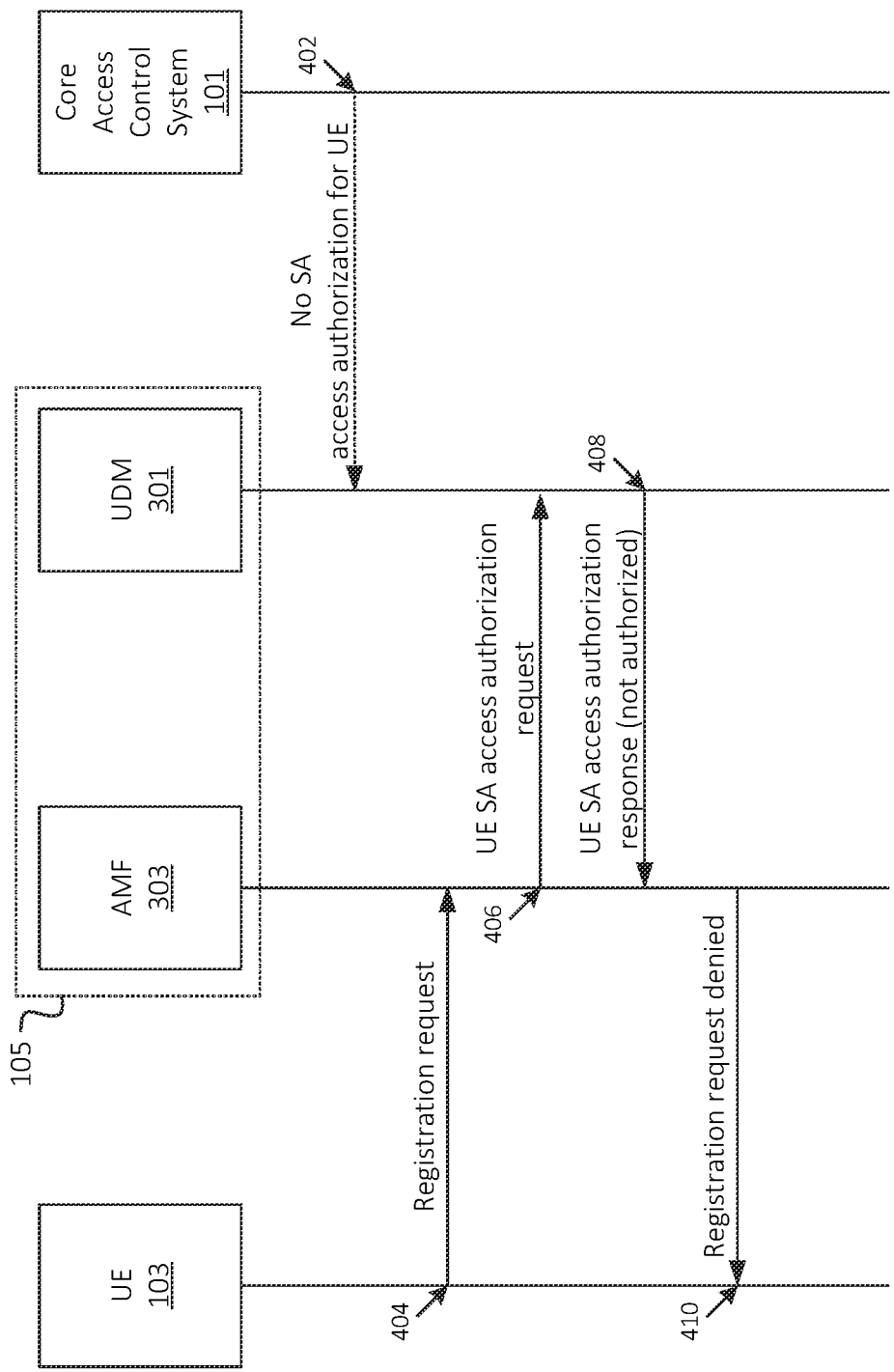
FIGS. 4 and 5 illustrate examples of a core network denying one or more registration requests from one or more UEs.

As noted above, providing for UEs 103 to check whether such UEs 103 are authorized to access 5GC 105, prior to UEs 103 attempting to register for communications with 5GC 105, may conserve resources and/or time that would otherwise be spent in unsuccessfully attempting to access 5GC 105. For example, as shown in FIG. 4, assume that a particular UE 103 is not authorized to access 5GC 105. For example, as discussed above, CACS 101 may indicate (at 402) that UE 103 is not authorized to access 5GC 105, and/or may forgo indicating that UE 103 is authorized to access 5GC 105. In this example, UDM 301 may accordingly maintain information indicating that UE 103 is not authorized to access 5GC 105, and/or may not maintain information indicating that UE 103 is authorized to access 5GC 105.

Further assume that UE 103 outputs (at 404) a registration request to AMF 303. In some embodiments, AMF 303 may determine, such as by obtaining (at 406 and 408) information indicating that UE 103 is not authorized to access 5GC 105, and/or based on which AMF 303 may determine that UE 103 is not authorized to access 5GC 105. Accordingly, AMF 303 may output (at 410) an indication to UE 103 that the registration request is denied.

Figure 5:
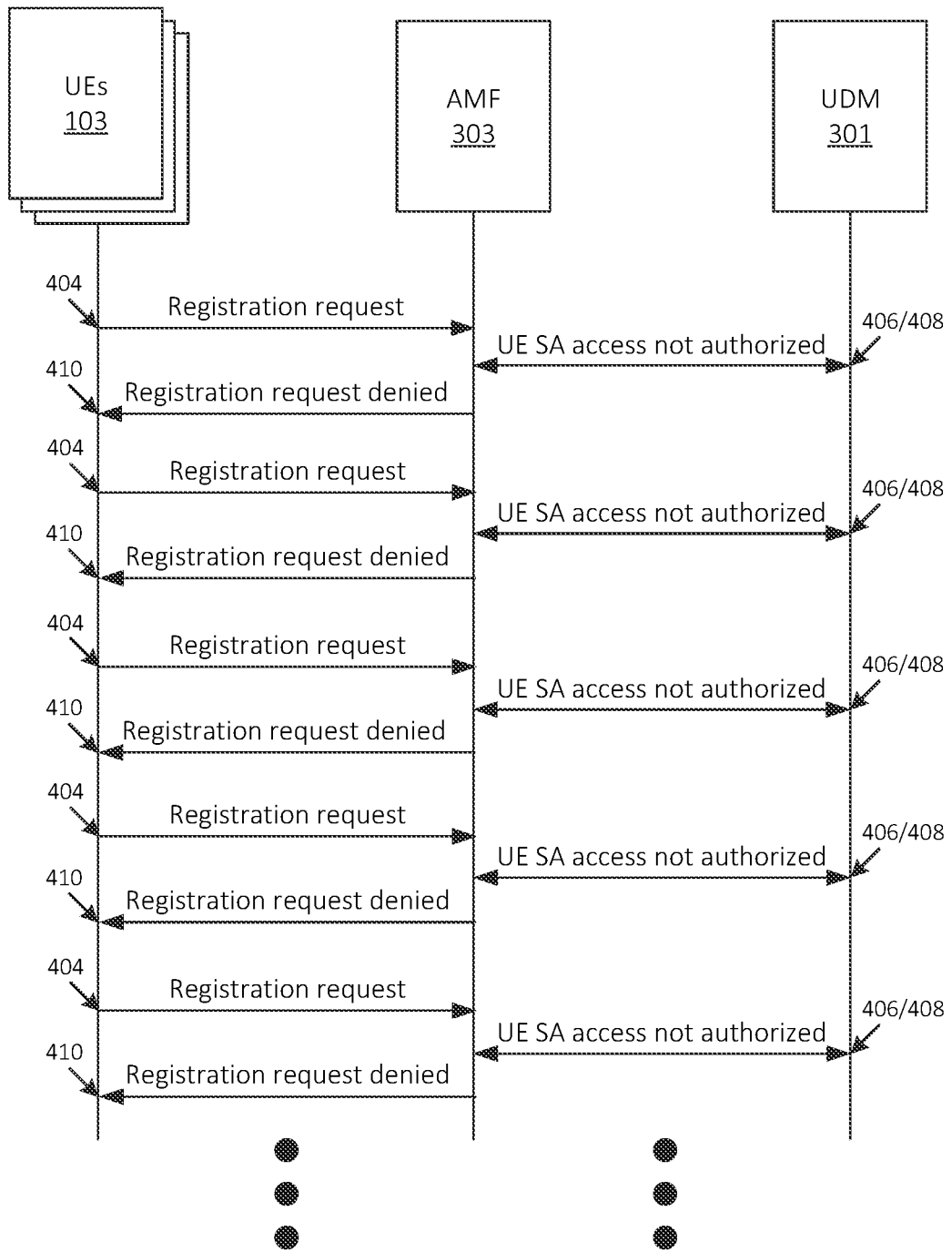

As shown in FIG. 5, in situations where hundreds or thousands of UEs 103 (e.g., UEs 103 that are not authorized to access 5GC 105) output such requests, determining that such requests should be denied may consume considerable network and/or processing resources of UDM 301 and/or AMF 303. Additionally, each UE 103 may exhibit a delay or "lag" in the time spent requesting access to 5GC 105 and receiving a denial of the request, thus degrading the user experience. Providing for UEs 103 to determine, prior to requesting access to a given core network (e.g., 5GC 105, in the example described herein), whether such UEs 103 are authorized to access the given core network may eliminate some or all consumption of resources, time, etc. that would otherwise be spent on unsuccessful access requests.

Figure 6:
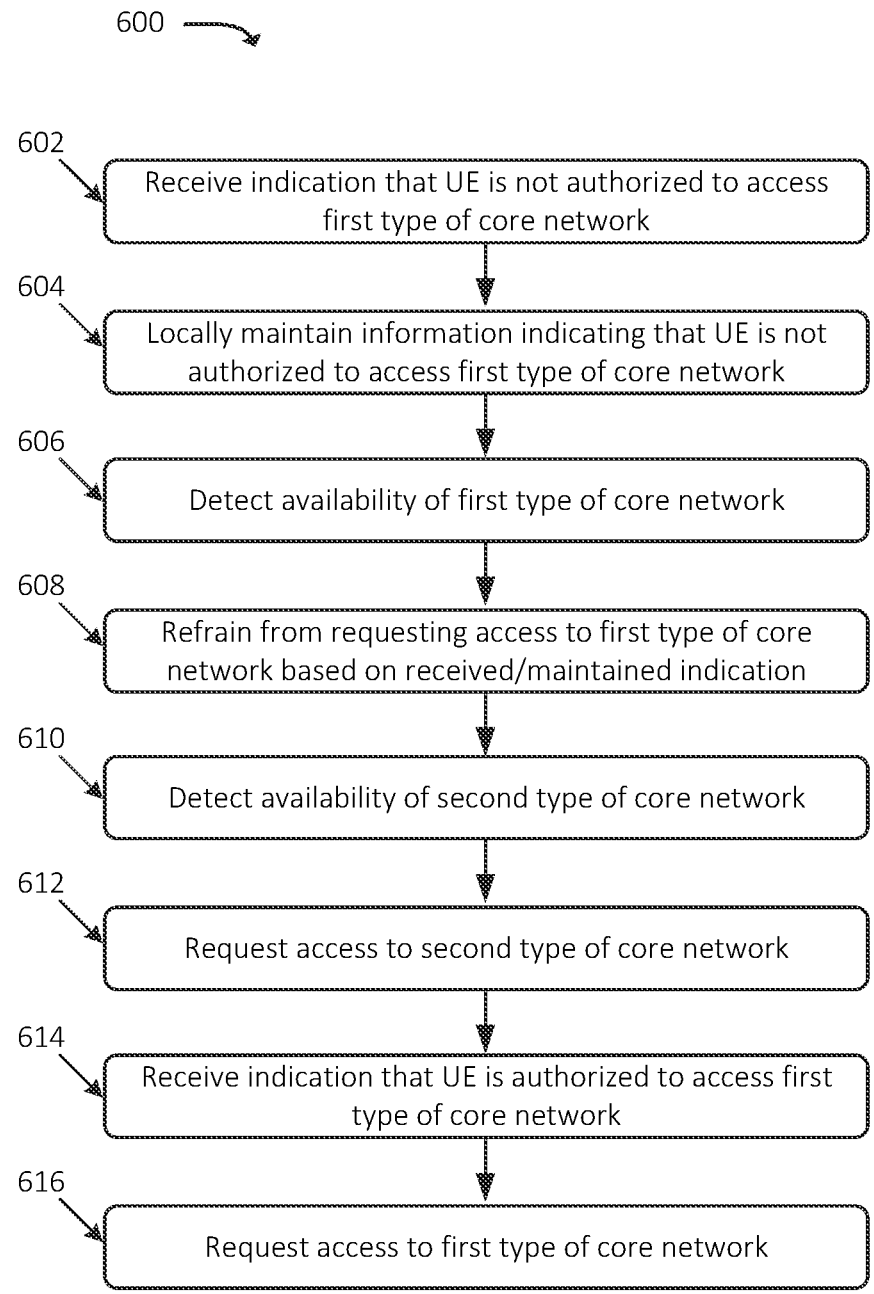
FIG. 6 illustrates an example process for selectively requesting access to a particular type of core network, in accordance with some embodiments.

FIG. 6 illustrates an example process 600 for selectively requesting access to a particular type of core network, in accordance with some embodiments. In some embodiments, some or all of process 600 may be performed by UE 103.

As shown, process 600 may include receiving (at 602) an indication that UE 103 is not authorized to access a first type of core network. For example, as discussed above, UE 103 may receive an indication (e.g., via an OTA update, via a provisioning or configuration procedure, via monitoring an external data source such as a blockchain, etc.) that UE 103 is not authorized to access one or more types of core networks, such as 5GC 105 and/or some other type of core network. For example, the particular type of core network may be associated with a particular set of protocols, one or more protocol stacks, one or more authentication mechanisms, etc. In some embodiments, UE 103 may be configured to implement such protocols, authentication mechanisms, etc., and/or may otherwise be capable of implementing such protocols, authentication mechanisms, etc. For example, in some embodiments, the first type of core network may be a 5GC 105 and UE 103 may be an SA-capable UE.

Process 600 may further include locally (at 604) maintaining information indicating that UE 103 is not authorized to access the first type of core network. For example, UE 103 may modify one or more files of SIM card 107, which is installed in, integrated in, etc. UE 103 in order to reflect that UE 103 is not authorized to access the particular type of core network. For example, in some embodiments, UE 103 may modify a UST associated SIM card 107, modify or remove one or more files (e.g., an $EF_{5GS3GPPLOCI}$ file), and/or otherwise locally maintain information indicating that UE 103 is not authorized to access the particular type of core network. In this manner, UE 103 may maintain information indicating particular core networks or types of core networks that UE 103 is authorized to access and/or that UE 103 is not authorized to access.

Process 600 may additionally include detecting (at 606) the availability of the first type of core network. For example, UE 103 may wirelessly connect to and/or detect the presence of one or more base stations (e.g., one or more gNBs 201 or some other type of base station). The one or more base stations may be communicatively coupled to the first type of core network. In some embodiments, the one or more base stations may provide an indication to UE 103 that the one or more base stations are communicatively coupled to the first type of network, such as via RRC messaging (e.g., messaging between the one or more base stations and UE 103), via broadcast messages (e.g., System Information Blocks ("SIBs"), Master Information Blocks ("MIBs"), etc.), and/or in some other suitable manner. In some embodiments, particular base stations or RANs, or particular types of base stations or RANs, may be communicatively coupled to particular types of core networks, and the presence of a particular base station, RAN, type of base station, and/or type of RAN may indicate the availability of the particular type of core network.

Process 600 may also include refraining (at 608) from requesting access to the first type of core network based on the received and/or maintained (at 602 and/or 604) information indicating that UE 103 is not authorized to access the first type of core network. For example, as UE 103 is not authorized to access the first type of core network, UE 103 may forgo outputting a request to access (e.g., to establish one or more communication sessions with) the first type of core network. For example, UE 103 may forgo outputting a registration request to an access control element of the first type of core network, such as an AMF. As discussed above, forgoing outputting such a registration request may conserve resources and time that would otherwise have been consumed in sending the registration request and receiving a rejection from the access control element. Additionally, forgoing outputting such a registration request may conserve resources of the access control element and/or one or more elements of the first type of core network that would have been consumed in checking authorization of UE 103 to access the first type of core network and in rejecting the request.

Process 600 may further include detecting (at 610) the availability of a second type of core network. For example, UE 103 may determine (e.g., based on RRC messaging, system broadcast messages, and/or in some other suitable manner) that a second type of core network is available for communications. In some embodiments, the second type of core network may between or may include EPC 109 while the first type of core network may be or may include 5GC 105.

Process 600 may additionally include requesting (at 612) access to the second type of core network. For example, UE 103 may determine that UE 103 is authorized to access the second type of core network based on information maintained in SIM card 107 that UE 103 is authorized to access the second type of core network. Additionally, or alternatively, UE 103 may determine that UE is authorized to access the second type of core network based on an absence of information maintained in SIM card 107 that UE 103 is not authorized to access the second type of core network. UE 103 may, accordingly, request the establishment of one or more communication sessions with the second type of core network using a set of protocols, protocol stacks, authentication mechanisms, etc. associated with the second type of network. In this manner, UE 103 may selectively communicate with the second type of core network in lieu of the first type of core network, even in situations where both types of core networks are both contemporaneously available.

Process 600 may also include receiving (at 614) an indication that UE 103 is authorized to access the first type of core network. For example, at some later time, UE 103 may receive (e.g., from CACS 101 or some other source) an indication that UE 103 is now authorized to access the first type of core network. For example, access to the first type of core network may have previously been restricted based on load metrics of the first type of core network (e.g., a high load or overload condition), based on subscription parameters of UE 103 (e.g., based on overages or usage limits), and/or other factors. Access to the first type of core network may subsequently be authorized for UE 103 based on one or more of such factors changing.

UE 103 may receive (at 614) the indication (e.g., from CACS 101) via OTA updates or in some other suitable manner. As similarly discussed above, UE 103 may perform one or more other operations based on receiving the indicating, such as updating locally stored information to reflect that UE 103 is now authorized to access the first type of core network. In some embodiments, UE 103 may periodically or intermittently determine (e.g., by checking SIM card 107) whether UE 103 is authorized to access the first type of core network. In some embodiments, UE 103 may determine whether UE 103 is authorized to access the first type of core network based on the occurrence of one or more events, such as power cycling of UE 103, rebooting of a modem of UE 103, the removal, replacement, or installation of SIM card 107, an OTA update procedure of SIM card 107, a REFRESH command received by UE 103, and/or other suitable events.

Process 600 may further include requesting (at 616) access to the first type of core network. For example, at some point after UE 103 receives (at 614) the indication that UE 103 is authorized to access the first type of core network, UE 103 may detect the availability of the first type of core network, and may request the establishment of one or more communication sessions with the first type of core network. As discussed above, UE 103 may utilize one or more protocols, authentication mechanisms, etc. associated with the first type of core network, when requesting access to the first type of core network. In this manner, access of particular UEs 103 or groups of UEs 103 to a particular type of core network may be dynamically controlled, and UEs 103 implementing embodiments described herein may request or refrain from requesting access to the particular type of core network based on authorization of such UEs 103 to access the particular type of core network, thus eliminating excessive signaling between UEs 103 and the particular type of core network.

Figure 7:
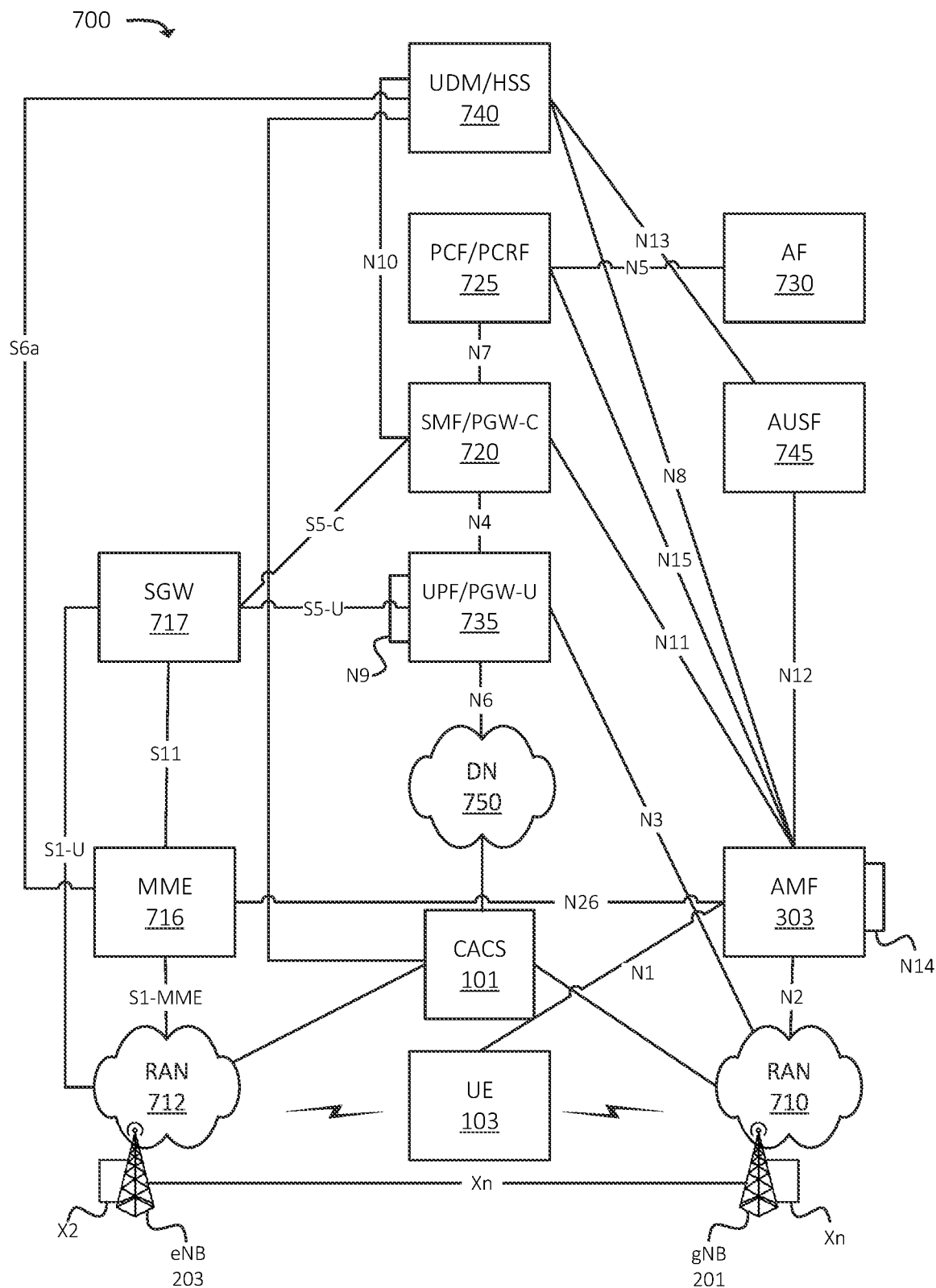
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G NSA architecture, in which a 5G RAT may be used in conjunction with one or more other RATs (e.g., an LTE RAT), and/or in which elements of 5GC 105 network may be implemented by, may be communicatively coupled with, and/or may include elements of another type of core network (e.g., an EPC). As shown, environment 700 may include UE 103, RAN 710 (which may include one or more gNBs 201), RAN 712 (which may include one or more eNBs 203), and various network functions such as AMF 303, MME 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, UDM/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as CACS 101.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 103 may include a computation and communication device, such as a wireless mobile communication device that is capable of communicating with RAN 710, RAN 712, and/or DN 750. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 103 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 201), via which UE 103 may communicate with one or more other elements of environment 700. UE 103 may communicate with RAN 710 via an air interface (e.g., as provided by gNB 201). For instance, RAN 710 may receive traffic (e.g., voice call traffic, data traffic, messaging traffic, signaling traffic, etc.) from UE 103 via the air interface, and may communicate the traffic to UPF/PGW-U 735, and/or one or more other devices or networks. Similarly, RAN 710 may receive traffic intended for UE 103 (e.g., from UPF/PGW-U 735, AMF 303, and/or one or more other devices or networks) and may communicate the traffic to UE 103 via the air interface.

RAN 712 may be, or may include, a LTE RAN that includes one or more base stations (e.g., one or more eNBs 203), via which UE 103 may communicate with one or more other elements of environment 700. UE 103 may communicate with RAN 712 via an air interface (e.g., as provided by eNB 203). For instance, RAN 710 may receive traffic (e.g., voice call traffic, data traffic, messaging traffic, signaling traffic, etc.) from UE 103 via the air interface, and may communicate the traffic to UPF/PGW-U 735, and/or one or more other devices or networks. Similarly, RAN 710 may receive traffic intended for UE 103 (e.g., from UPF/PGW-U 735, SGW 717, and/or one or more other devices or networks) and may communicate the traffic to UE 103 via the air interface.

AMF 303 may include one or more devices, systems, Virtualized Network Functions ("VNFs"), Cloud-Native Network Functions ("CNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 710 and/or gNBs 201, and/or to perform other operations. In some embodiments, the 5G network may include multiple AMFs 303, which communicate with each other via the N14 interface (denoted in FIG. 7 by the line marked "N14" originating and terminating at AMF 303).

MME 716 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 712 and/or eNBs 203, and/or to perform other operations.

SGW 717 may include one or more devices, systems, VNFs, CNFs, etc., that aggregate traffic received from one or more eNBs 203 and send the aggregated traffic to an external network or device via UPF/PGW-U 735. Additionally, SGW 717 may aggregate traffic received from one or more UPF/PGW-Us 735 and may send the aggregated traffic to one or more eNBs 203. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 103. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 103, from DN 750, and may forward the user plane data toward UE 103 (e.g., via RAN 710, SMF/PGW-C 720, and/or one or more other devices). In some embodiments, multiple UPFs 735 may be deployed (e.g., in different geographical locations), and the delivery of content to UE 103 may be coordinated via the N9 interface (e.g., as denoted in FIG. 7 by the line marked "N9" originating and terminating at UPF/PGW-U 735). Similarly, UPF/PGW-U 735 may receive traffic from UE 103 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 103.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 103 may communicate, through DN 750, with data servers, other UEs 103, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 103 may communicate.

Figure 8:
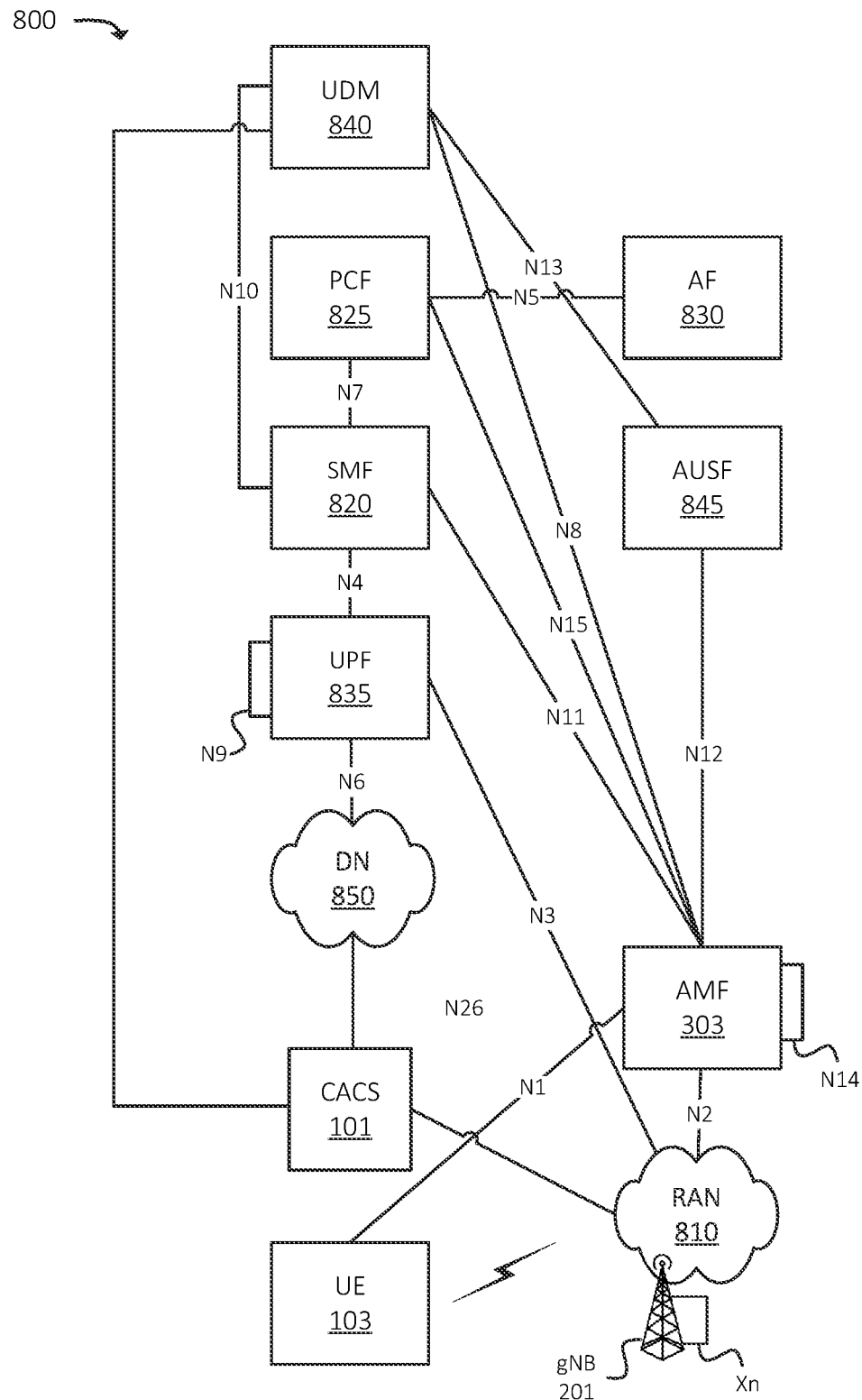

FIG. 8 illustrates example environment 800, which may correspond to an SA architecture, and/or a portion of an NSA architecture (e.g., an NSA architecture in which 5GC 105 is used). For example, environment 800 may include RAN 810 (e.g., a 5G RAN), one or more elements of 5GC 105 (e.g., AMF 303, SMF 820, PCF 825, AF 830, UPF 835, UDM 840, and/or AUSF 845), DN 850, and/or CACS 101.

Figure 9:
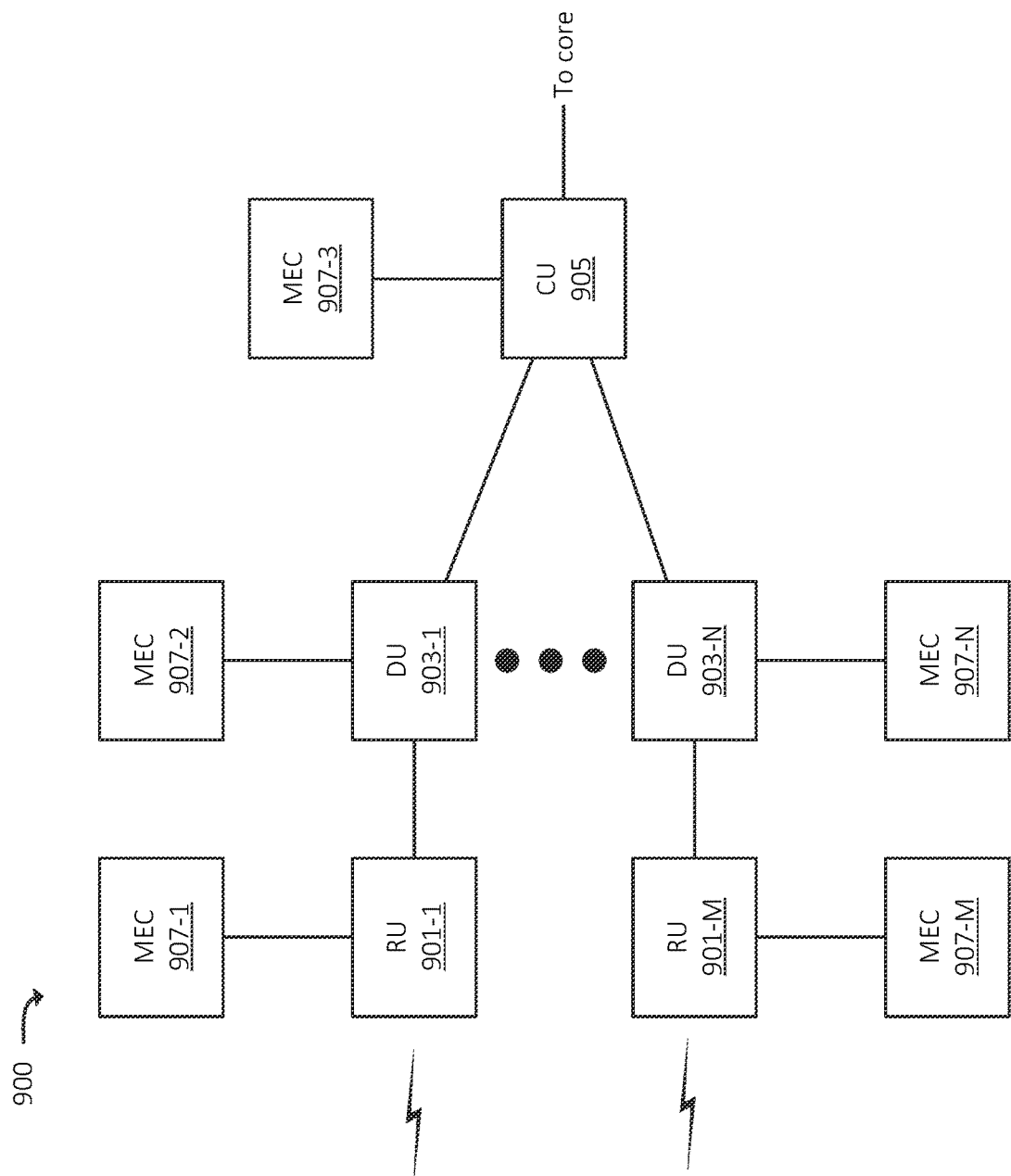
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 710, RAN 712, or some other RAN). In some embodiments, a particular RAN may include one DU network 900. In some embodiments, a particular RAN may include multiple DU networks 900. In some embodiments, DU network 900 may correspond to a particular gNB 201 of a 5G RAN (e.g., RAN 710). In some embodiments, DU network 900 may correspond to multiple gNBs 201. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 7, such as AMF 303 and/or UPF/PGW-U 735). In the uplink direction (e.g., for traffic from UEs 103 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 103, and may determine which DU(s) 903 should receive the downlink traffic. DU 903 may include one or more devices that transmit traffic between a core network (e.g., via CU 905) and UE 103 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 103.

RU 901 may include hardware circuitry (e.g., one or more RF transceivers, antennas, radios, and/or other suitable hardware) to communicate wirelessly (e.g., via an RF interface) with one or more UEs 103, one or more other DUs 903 (e.g., via RUs 901 associated with DUs 903), and/or any other suitable type of device. In the uplink direction, RU 901 may receive traffic from UE 103 and/or another DU 903 via the RF interface and may provide the traffic to DU 903. In the downlink direction, RU 901 may receive traffic from DU 903, and may provide the traffic to UE 103 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 103, via a respective RU 901.

For example, RU 901-1 may route some traffic, from UE 103, to MEC 907-1 instead of to a core network (e.g., via DU 903 and CU 905). MEC 907-1 may process the traffic, perform one or more computations based on the received traffic, and may provide traffic to UE 103 via RU 901-1. In this manner, ultra-low latency services may be provided to UE 103, as traffic does not need to traverse DU 903, CU 905, and an intervening backhaul network between DU network 900 and the core network. In some embodiments, MEC 907 may include, and/or may implement, some or all of the functionality described above with respect to CACS 101, UPF 735, and/or one or more other devices, systems, VNFs, CNFs, etc.

Figure 10:
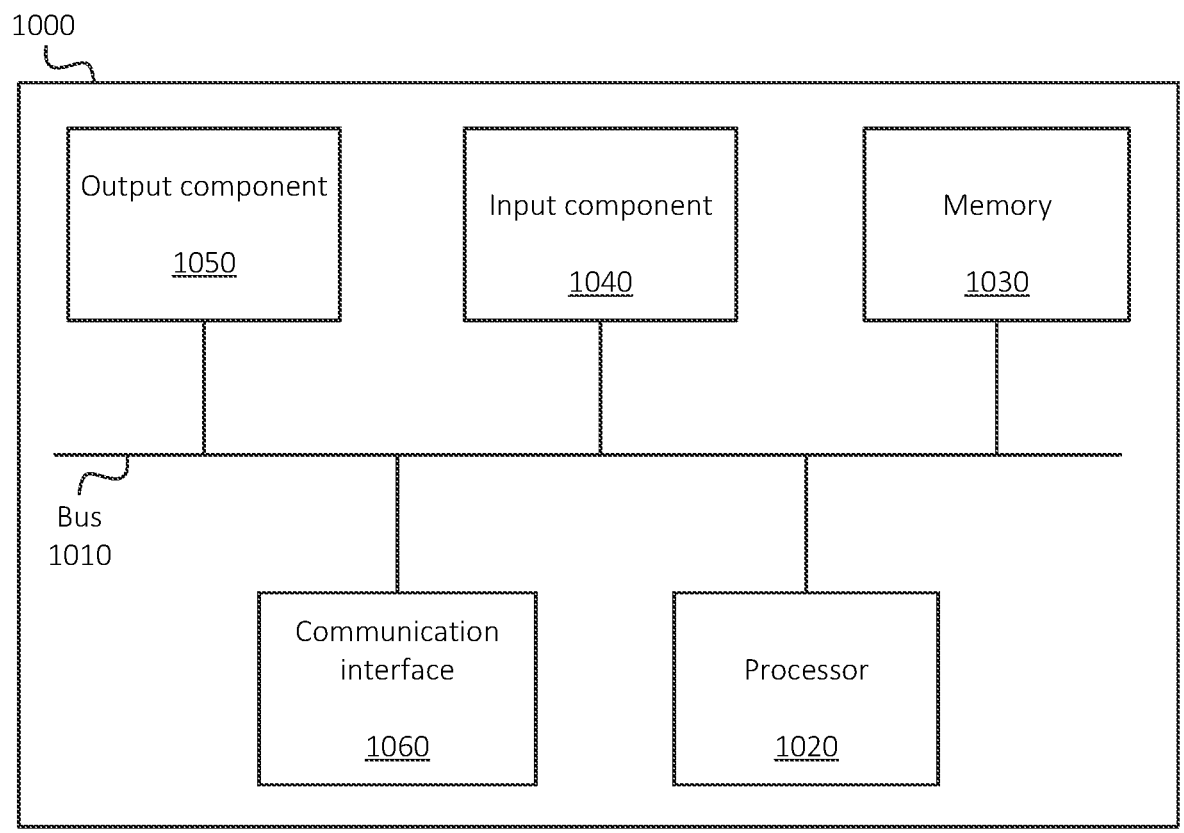
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth© radio, or the like. The wireless communication device may be coupled to an external device, such as a remote control, a wireless keyboard, a mobile telephone, etc.

In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive an indication that the device is not authorized to access a first type of core network;
   detect that a first core network, of the first type of core network, is available for communication, wherein detecting that the first and second core networks are available for communication includes wirelessly detecting a presence of one or more base stations that are communicatively coupled to the first and second core networks, wherein the one or more base stations include:
   a first base station that is communicatively coupled to the first core network, and
   a second base station that is communicatively coupled to the first base station and the second core network, wherein the first base station communicates with the second core network via the second base station;
   detect that a second core network, of a second type of core network, is available for communication; and
   request, based on the indication that the device is not authorized to access the first type of core network, establishment of a communication session with the second core network.

2. The device of claim 1, wherein the first core network includes a Fifth Generation ("5G") Core ("5GC"), wherein the second core network includes an Evolved Packet Core ("EPC"), and wherein the device includes a Fifth Generation ("5G") Standalone ("SA")-capable User Equipment ("UE").

3. The device of claim 1, wherein the one or more processors are further configured to:
  modify one or more local files based on receiving the indication that the device is not authorized to access the first type of core network.

4. The device of claim 3, wherein the one or more local files are associated with a Subscriber Identification Module ("SIM") card of the device.

5. The device of claim 1, wherein the first type of core network is associated with a first set of communication protocols and wherein the second type of core network is associated with a second set of communication protocols, wherein requesting establishment of the communication session with the second core network includes communicating with the second core network using the second set of communication protocols.

6. The device of claim 1, wherein the indication is a first indication, wherein the one or more processors are further configured to:
  receive a second indication that the device is authorized to access the first type of core network;
  detect, after receiving the second indication, that the first and second core networks are available for communication; and
  request, based on the second indication that the device is authorized to access the first type of core network, establishment of a communication session with the first core network.

7. A non-transitory computer-readable medium, storing a plurality of processor-executable instructions executable by a device, wherein executing the plurality of processor-executable instructions causes the device to:
  receive an indication that the device is not authorized to access a first type of core network;
  detect that a first core network, of the first type of core network, is available for communication, wherein detecting that the first and second core networks are available for communication includes wirelessly detecting a presence of one or more base stations that are communicatively coupled to the first and second core networks, wherein the one or more base stations include:
    a first base station that is communicatively coupled to the first core network, and
    a second base station that is communicatively coupled to the first base station and the second core network, wherein the first base station communicates with the second core network via the second base station;
  detect that a second core network, of a second type of core network, is available for communication; and
  request, based on the indication that the device is not authorized to access the first type of core network, establishment of a communication session with the second core network.

8. The non-transitory computer-readable medium of claim 7, wherein the first core network includes a Fifth Generation ("5G") Core ("5GC"), wherein the second core network includes an Evolved Packet Core ("EPC"), and wherein the device includes a Fifth Generation ("5G") Standalone ("SA")-capable User Equipment ("UE").

9. The non-transitory computer-readable medium of claim 7, wherein the plurality of processor-executable instructions further include processor-executable instructions to:
  modify one or more local files based on receiving the indication that the device is not authorized to access the first type of core network.

10. The non-transitory computer-readable medium of claim 9, wherein the one or more local files include a Universal Mobile Telecommunications Service Subscriber Identification Module ("SIM") Service Table.

11. The non-transitory computer-readable medium of claim 7, wherein the first type of core network is associated with a first set of communication protocols and wherein the second type of core network is associated with a second set of communication protocols, wherein requesting establishment of the communication session with the second core network includes communicating with the second core network using the second set of communication protocols.

12. The non-transitory computer-readable medium of claim 7, wherein the indication is a first indication, wherein the plurality of processor-executable instructions further include processor-executable instructions to:
  receive a second indication that the device is authorized to access the first type of core network;
  detect, after receiving the second indication, that the first and second core networks are available for communication; and
  request, based on the second indication that the device is authorized to access the first type of core network, establishment of a communication session with the first core network.

13. A method, comprising:
  receiving, by a device, an indication that the device is not authorized to access a first type of core network;
  detecting that a first core network, of the first type of core network, is available for communication, wherein detecting that the first and second core networks are available for communication includes wirelessly detecting a presence of one or more base stations that are communicatively coupled to the first and second core networks, wherein the one or more base stations include:
    a first base station that is communicatively coupled to the first core network, and
    a second base station that is communicatively coupled to the first base station and the second core network, wherein the first base station communicates with the second core network via the second base station;
  detecting that a second core network, of a second type of core network, is available for communication; and
  requesting, based on the indication that the device is not authorized to access the first type of core network, establishment of a communication session with the second core network.

14. The method of claim 13, wherein the first core network includes a Fifth Generation ("5G") Core ("5GC"), wherein the second core network includes an Evolved Packet Core ("EPC"), and wherein the device includes a Fifth Generation ("5G") Standalone ("SA")-capable User Equipment ("UE").

15. The method of claim 13, further comprising:
  modifying one or more local files based on receiving the indication that the device is not authorized to access the first type of core network.

16. The method of claim 15, wherein the one or more local files are associated with a Subscriber Identification Module ("SIM") card of the device.

17. The method of claim 16, wherein the one or more local files include a Universal Mobile Telecommunications Service SIM Service Table.

18. The method of claim 16, wherein the one or more local files include a Universal Mobile Telecommunications Service SIM Service Table.

19. The method of claim 13, wherein the first type of core network is associated with a first set of communication protocols and wherein the second type of core network is associated with a second set of communication protocols, wherein requesting establishment of the communication session with the second core network includes communicating with the second core network using the second set of communication protocols.

20. The method of claim 13, wherein the indication is a first indication, the method further comprising:
- receiving a second indication that the device is authorized to access the first type of core network;
- detecting, after receiving the second indication, that the first and second core networks are available for communication; and
- requesting, based on the second indication that the device is authorized to access the first type of core network, establishment of a communication session with the first core network.

* * * * *